United States Patent [19]

Galand et al.

[11] Patent Number: 4,782,523
[45]* Date of Patent: Nov. 1, 1988

[54] TONE DETECTION PROCESS AND DEVICE FOR IMPLEMENTING SAID PROCESS

[75] Inventors: Claude Galand, Cagnes sur Mer; Guy Roulier, Nice; Robert Vermot-Gauchy, Saint Paul de Vence; Hélène Cerf-Danon, Paris, all of France

[73] Assignee: International Business Machines Corp., Armonk, N.Y.

[21] Appl. No.: 43,053

[22] Filed: Apr. 27, 1987

[30] Foreign Application Priority Data

Apr. 30, 1986 [EP] European Pat. Off. ...... 864330013.2

[51] Int. Cl.⁴ ............................................. H04M 1/00
[52] U.S. Cl. .................................. 379/386; 324/77 B
[58] Field of Search ....................... 379/386; 328/138; 324/77 B; 364/485, 484

[56] References Cited

U.S. PATENT DOCUMENTS 4,286,326  8/1981  Houdard ............................. 379/386

OTHER PUBLICATIONS

1979 IEEE International Conference on Acoustics, Speech & Signal Processing, Washington, D.C. "New Concept of Digital Multi-Frequency Receiver" pp. 863–867.

"Application of Digital Signal Processing to No. 5 Signalling System", pp. E.1.2.1–E.1.2.5.

Primary Examiner—Stafford D. Schreyer
Attorney, Agent, or Firm—Edward H. Duffield

[57] ABSTRACT

The process is made to detect a received tone including at least one single predetermined frequency, within a signal encoded using block coding and Linear Prediction Coding techniques providing auto-correlation coefficients R(i) and direct form coefficients a(i). The process is based upon Fourier Transform computations over the successive blocks of a(i)'s, with table look up tone identification, further confirmed upon R(i)'s stationarity detecting.

13 Claims, 7 Drawing Sheets

TONE DETECTION PROCESS AND DEVICE FOR IMPLEMENTING SAID PROCESS

FIELD OF INVENTION

This invention deals with tone detection wherein a predetermined frequency tone is to be detected within received data. The invention more particularly applies to Multi-Frequency Receivers.

BACKGROUND OF THE INVENTION

Several applications need detecting one or several predetermined tone(s) within received data. Such is the case when an alarm tone should be detected embedded within received data at a receiving station within a network like for instance in applications where a test procedure should be initiated subsequent to said tone detection. The test procedure may require starting with turning the whole network off, thus obviously any false tone detection should be avoided.

Another application relates to Multi-Frequency receivers (MFR) wherein signalling tones combining two single frequency waveforms should be detected in a Touch Tone telephone network.

The use of Touch Tone is becoming wide spread. These phones enable the users to send data (12 or 16 digits) over the telephone lines to a receiver which can then take an action according to the sequence of tones.

The store and forward system is a good example : Calls to a subscriber are stored on disks while he/she is not reachable. The subscriber can then later call the system and by sending digits identify him/herself, retrieve any stored messages or forward the messages to a third person.

In order to do so the system must be able to differentiate the digits. Furthermore, the electrical signals representing the digits should be well defined and eventually normalized, by the CCITT for instance.

An easy and inexpensive way to generate digits is to represent them by the sum of two sinusoidal signals at different frequencies.

$$x(t) = A1 \cdot \sin(2 \cdot \pi \cdot f1 \cdot t + \phi 1) + A2 \cdot \sin(2 \cdot \pi \cdot f2 \cdot t + \phi 2)$$

The frequencies will then be detected by the receiver and by table look up or any other means the digit will be recognized.

Traditionally Multi-Frequency detection is handled in one of the following ways.

By using a specialized chip operating on the analog signal. But this requires a specialized circuit which increases the cost of the required equipment.

Another alternative requires sharp and accurate filters or banks of filters. These filters may be digitally implemented using a signal processor.

A third approach may be based on FAst Fourier Transforms (FFT) or DFT also implemented in a signal processor, over samples of the received signal to be processed.

For instance, let x(n), [n=0, ... ,N−1] denote the input signal corresponding to a block of N samples.

The FFT is a fast evaluation of the DFT of the sequence x(n) defined by:

$$X(k) = \sum_{n=0}^{N-1} x(n) \cdot e^{-2j \cdot \pi \cdot k \cdot n / N} \quad k = 0, \ldots, N-1 \tag{1}$$

where
 $\pi = 3.14$ and
 SUM standing for a summing or accumulating operation.

Thus, the filter or FFT based methods involve a high processing load, equivalent to several MIPS (say 2 to 4 MIPS) which may correspond to up to 40% of a signal processor capability.

Improved digital methods have already been proposed bringing the processing load to a little less than 10%.

The present invention further lowers the required processing load to about 1 to 5% of the considered signal processor once associated to a linear Prediction Coder.

SUMMARY OF INVENTION

In a digital network wherein signals are to be encoded using linear Prediction Coding (LPC) techniques, a process is provided for detecting embedded tones using FFT approach performed over linear Prediction parameters.

The invention will now be described on a preferred embodiment made with reference to the attached drawings.

DESCRIPTION OF A PREFERRED EMBODIMENT

The method is made to apply to a network including digital coders operating over fixed length consecutive segments of signal, said segments being sampled into blocks of N samples and subsequently coded using block coding techniques. One such technique has been described by A. Croisier in "Progress in PCM and Delta Modulation: Block Companded Coding of Speech Signal" Zurich, 1974 International Seminar on Digital Communications.

The method is also DFT based, and the preferred embodiment will be described with reference to a MFR made to detect a tone made of two single frequency waveforms, each one belonging to a different group of predetermined frequencies, as defined by the CCITT.

Let x(n), (n=0, ... , N−1) denote the input signal corresponding to a block of N samples. N may typically be equal to 80 corresponding to a 10 ms long segment of signal sampled at 8 kHz, or be higher. Obviously DFT operations transposing from the time domain into the frequency domain would lead to detecting the signal frequency components.

For N=128, the frequency resolution for a 4 KHz bandwidth signal would be:

$$\frac{4000}{128} = \text{approx. 30 Hz.}$$

Which is sufficient to separate two frequencies belonging to the same MF group of a conventional MFR.

The MFR detection, in practice, does not require the computation of all the X(k) complex values, but only at specific frequencies (tone frequencies and reference frequencies). For a conventional MFR each tone is made of two sinewaves out of one of two predefined 4-frequencies groups. The whole set of predetermined frequencies could thus be limited to nine frequencies, i.e. 2×4 frequencies or group frequencies and one single reference frequency.

Although the MFR detection does not require the computation of al the X(k) complex values, but only at the specific predefined frequencies, the explicit computation of expression (1) for nine frequencies provides a high processing load due to the length of the sequence submitted to FFT computation. There are (9.N) complex multiplications to perform per input sample which is a rather high computing workload particularly for a processor already involved in other tasks such as voice coding operations.

The present invention is made to provide solution to these problems based on a clever use of the specific characteristics of linear Prediction analysis techniques. These techniques have been described in the following references (herein incorporated by reference):

European Pat. No.0002998 to this applicant.

"Voice-Excited Predictive Coder (VEPC) implementation on a high-performance Signal Processor" by C. Galand et al, in IBM Journal of Research and Development, vol 29, Number 2, March 1985, pp 147-157.

"7.2/9.6 kbps Voice Excited Predictive Coder" presented by D. Esteban et al, at ICASSP Conference, Tulsa, 1978.

Linear Prediction analysis per se leading to the generation of spectral descriptors of a signal represented by sets of coefficients have also already been disclosed in the literature. For extensive considerations, one may refer to European Pat. No. 0002998 or the J. Leroux and C. Gueguen, "A Fixed Point Computation of Partial Correlation Coefficients" IEEE Trans on Acoustics, Speech and Signal Processing ASSP-25, 257–259 (June 1977), also herein incorporated by reference.

For the purposes of this invention, one needs only note that the linear prediction analysis of the sequence.

$x(n), (n=0, \ldots, N-1)$, provides a set of linear prediction coefficients $a(i), (i=0, \ldots, p)$, representing the predictor filter P(Z):

$$P(Z) = \frac{1}{A(Z)} \quad (2)$$

$$A(Z) = \text{SUM}_{i=0}^{P} a(i) \cdot Z^{-i} \quad (3)$$

In fact, the $a(i), (i=0, \ldots, p)$ coefficients are an accurate descriptor of the spectral density of the sequence $x(n), (n=0, \ldots, N-1)$, provided that the signal x(n) can be modelized by an autoregressive process (AR). Speech can MF tones are such a well modelized signal. The predictor order p is fixed to two times the number of poles of the input signal; for telephone speech, p is usually taken equal to 8. Practical means for deriving the a(i) coefficient from the original blocks of signal samples have been extensively described in the above cited references.

Figure 1:
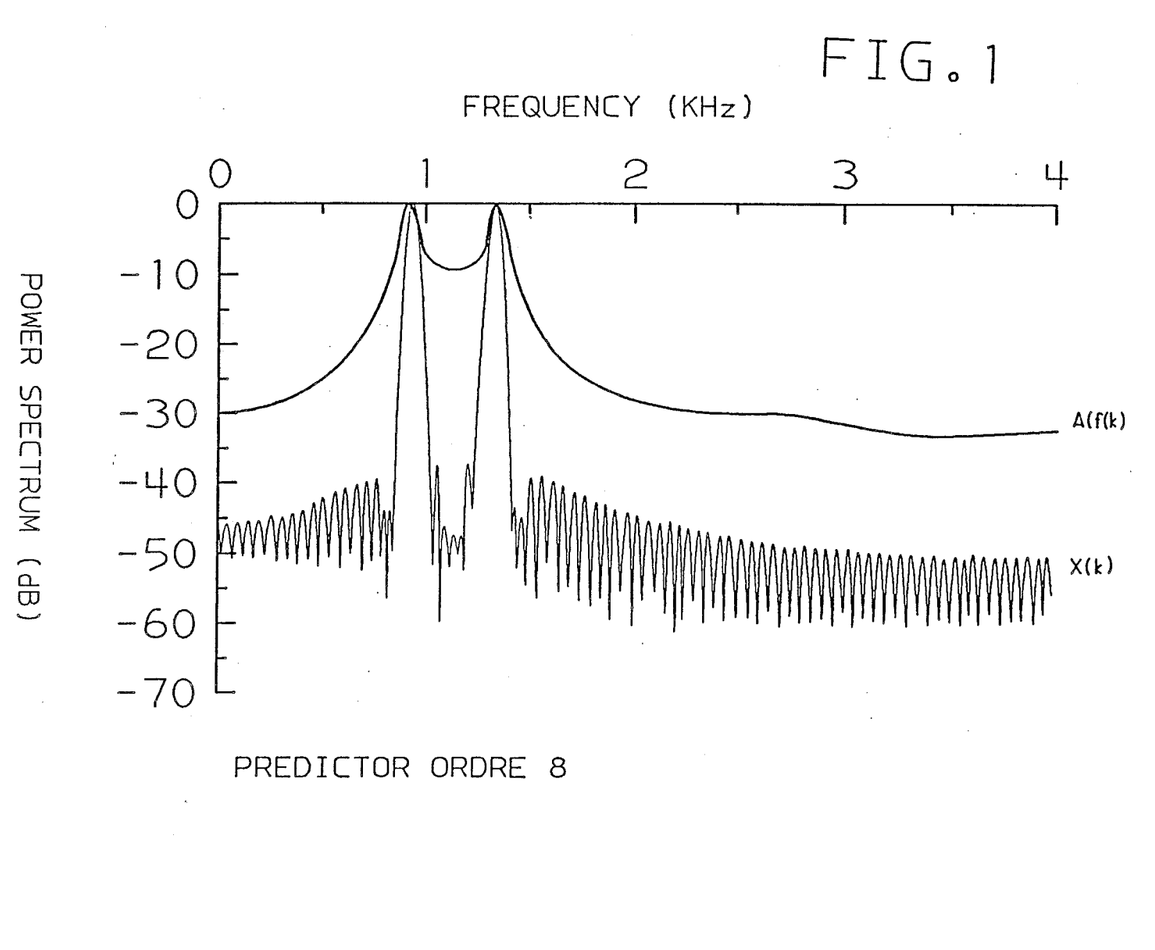
FIG. 1 shows modules of two FFT operations based on signal samples and on linear Prediction parameters, respectively.

FIG. 1 shows for example the module X(k) of the FFT of the x(n) sequence and the module A(k) of the FFT of the a(i) sequence, assuming a p=8th order approximation. It can be seen that the FFT of both sequences give an accurate estimation of the resonances. However, the sequence $a(i), (i=0, \ldots, p)$ is much shorter than the sequence $x(n), (n=0, \ldots, N-1)$. Therefore relation (1) can be evaluated in a much more efficient way, when applied to the sequence of linear prediction parameters a(i) derived from the analysis of the successive blocks of received signal samples x(n).

In fact, for a typical MFR applied to telephony, it is only necessary to evaluate A(Z) in (3) for the given set of frequencies f(k) in Hertz, included in the following groups defined by the CCITT; plus one or two reference frequencies:

| MF GROUP 1 | MF GROUP 2 |
|---|---|
| f(1) = 697 | f(5) = 1209 |
| f(2) = 770 | f(6) = 1336 |
| f(3) = 852 | f(7) = 1477 |
| f(4) = 941 | f(8) = 1633 |

REFERENCE FREQUENCY: f(0)=500
SAMPLING FREQUENCY: fs=8000

$$A(f(k)) = \text{SUM}_{n=0}^{p-1} a(n) \cdot e^{-2j \cdot \pi \cdot n \cdot f(k)/fs} \quad (4)$$

$k = 0, \ldots, 8$ and $p = 8$ basically

Figure 2:
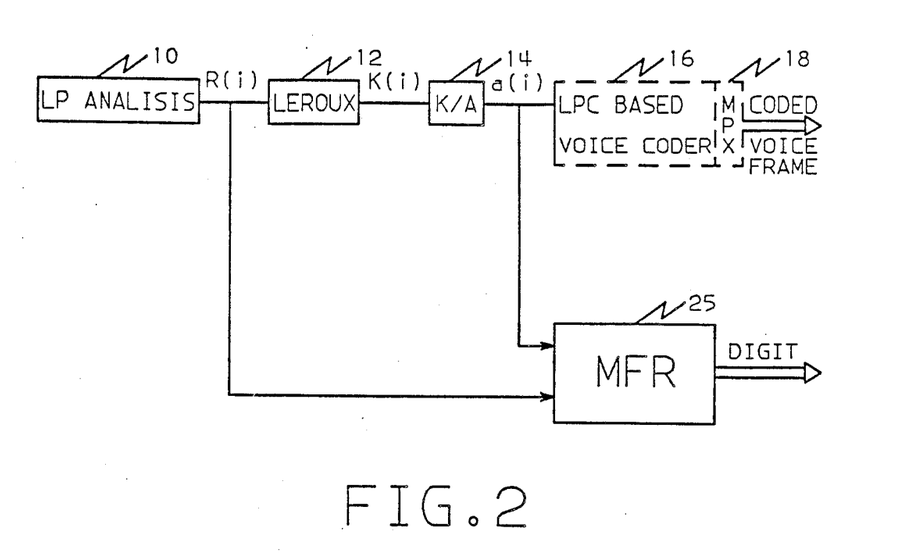
FIG. 2 represents the implementation of the MFR function using data provided by a linear Prediction Coder.

FIG. 2 represents the implementation of the MFR function, assuming an already available linear prediction (LP) based voice coder. Such a coder can be either the VEPC as disclosed for instance in either one of the above cited references, or any LPC vocoder, or any APC coder. For a stand alone MFR, the LP function should be implemented so as to make the MF analysis on the a(i) coefficients.

Referring to the IBM Journal reference cited above, and more particularly to FIG. 2 therein, one may see a block diagram showing the various coder components involved and providing the determination of linear prediction coefficients a(i) and auto correlation coefficients R(i).

In addition a detailed description of the method and means involved in performing the signal processing operations leading from the input signal samples to the sets of corresponding R(i) and a(i) coefficients has been described in the above referenced European patent.

FIG. 2 of this application may be considered as a simplified representation of the VEPC coder represented in the IBM Journal, with in addition a box, designated MFR, representing the multi-frequency receiver made according to the invention. This is made to show how and where this invention would fit into a VEPC. But, needless to mention that the invention could obviously be implemented in a stand-alone way. The VEPC could only make the sets of coefficients to be used in this invention, readily available.

In summary, for each 10 or 20 ms long segment of signal, a block of N=80 or N=160 samples of signal $x(n),(n=0, \ldots N-1)$ is derived, the linear prediction analysis (LP Analysis (10)) of which provdes a set of autocorrelation coefficients $R(i),(i=0, \ldots ,p)$ with $p=8$ for instance, which are used in the Leroux-Guegen converter (12) to derive a set of partial correlation coefficients $K(i),(i=1, \ldots ,p)$, which are converted in the step-up procedure (K/A (14)) to the direct form linear prediction coefficients $a(i),(i=0, \ldots ,p)$.

Given the a(i)'s and R(i)'s for each block of processed input signal, the processing specific to the MFR function will proceed according to the following steps:

Detect current block stationarity using the R(i)'s and set a stationarity bit up;

Compute frequency components by DFT on current set of a(i)'s;

Detect received tone components and identify tone digit.

Validate identified digit using stationarity bit.

Figure 3:
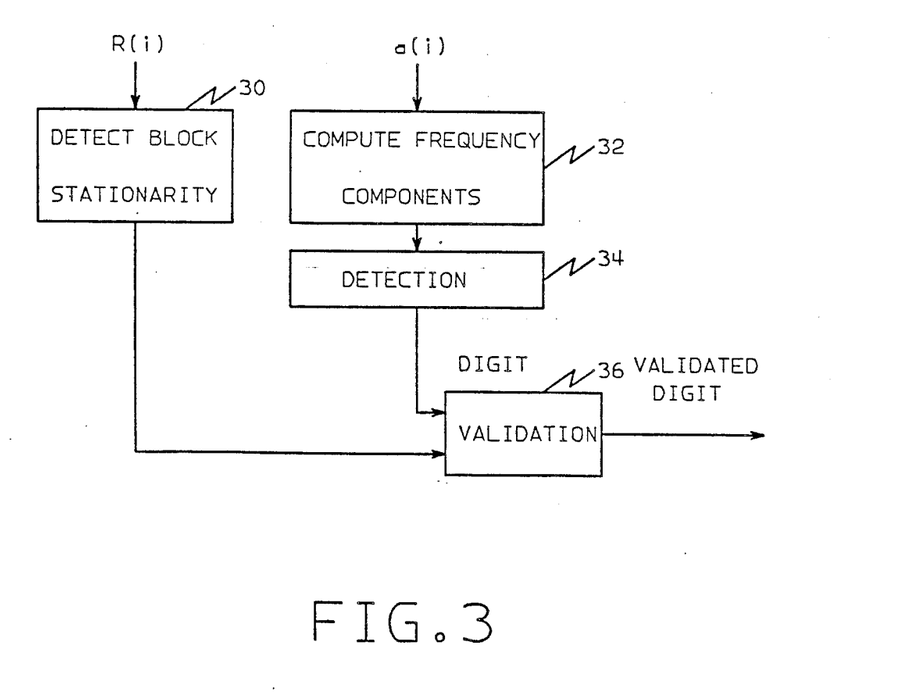
FIG. 3 represents a simplified block diagram of the MFR.

FIG. 3 represents a simplified block diagram explaining the basic of the MFR. It mainly consists in four devices: a device (30) for detecting block stationarity, a device (32) for evaluating frequency components ; a detection device (34), and a validation device (36), which are detailed hereafter:

Block stationarity or stability detection (30):

For each block of input samples $x(n), (n=0, \ldots ,N-1)$, one compute the so-called block stationarity of stability by:

$$S = \operatorname*{SUM}_{i=0}^{p} |R(i) - R(old)(i)| \quad (5)$$

where R(old) (i), $(i=0, \ldots ,p)$, represents the set of autocorrelation coefficients obtained at the previous block of samples, while R(i) reference is used for the current block.

The storage of new coefficients is performed after the computation of S by:

(6) $R(old)(i)=R(i)$ $i=0, \ldots p$

Then the value S is compared to a given threshold THO. It has been experimentally found that in MF tones, the S value is very small. Namely, the R(i) coefficients do not vary by more than a few percent from one block to the other, independently of the initial phases of the frequencies composing the tone signal.

So the THO threshold can be very small. The result of the test (S<THO) is furthermore used in the validation building block.

Frequency components determination (32):

For each block of input samples $x(n), (n=0, \ldots ,N-1)$, relation (4) is evaluated for each of the 9 frequencies $f(0), \ldots ,f(8)$ mentioned above. The 9 complex values are then used to derive 9 amplitudes which are forwarded to the next building block. The 9 frequency amplitudes are denoted $F(k),(i=0, \ldots ,8)$.

(7) $F(k)= |A(f(k))|$.

Figure 4:
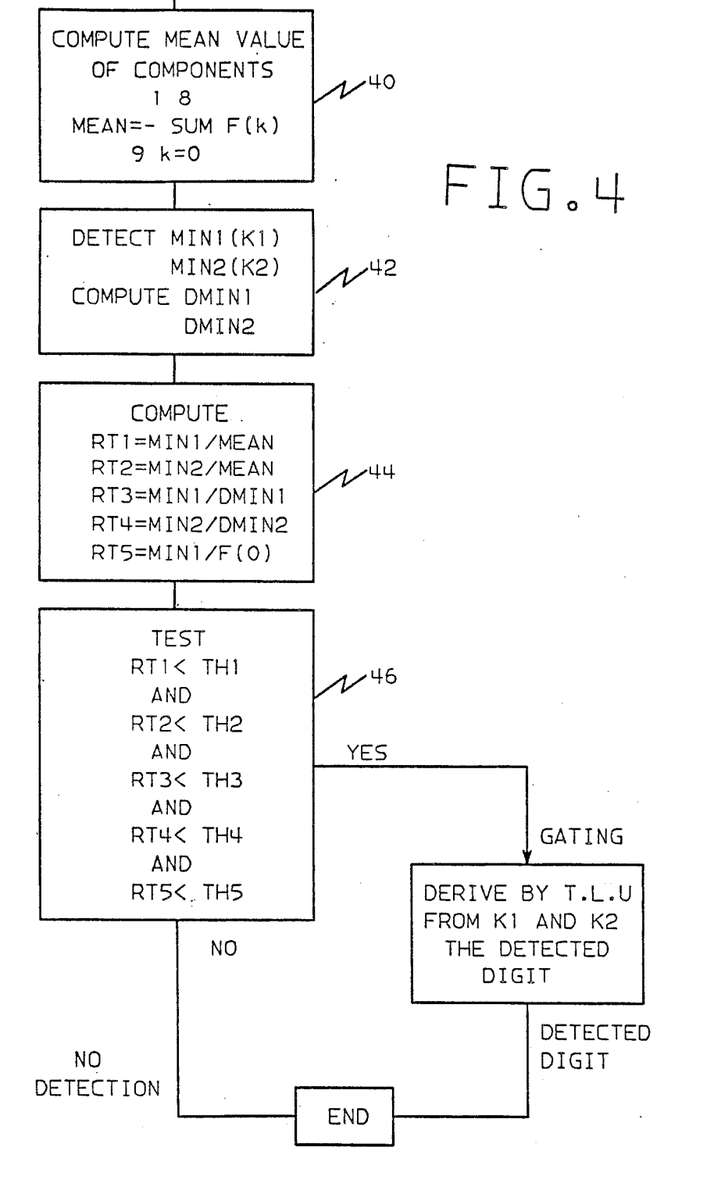
FIG. 4 shows a detailed representation of one of the blocks of FIG. 3.

Detection (34):

The detection (34) is based on testing ratios with respect to predefined threshold(s) and with respect to the reference frequency and may be performed according to the diagram shown in FIG. 4.

First in 40, the mean value of the F(k) components is computed, $$\text{MEAN} = \frac{1}{9} \operatorname*{SUM}_{k=0}^{8} F(k).$$

Figure 5:
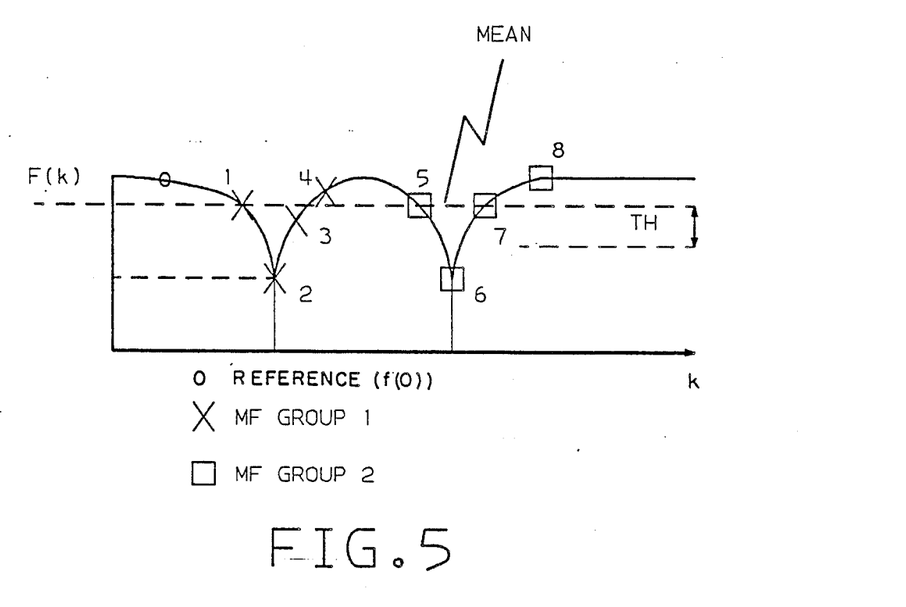
FIG. 5 shows a plot of tone components values obtained by using the proposed method.

This gives information on the relative amplitude of the resonances. Indeed, the F(k) pattern for a MultiFrequency (MF) signal will look as shown in FIG. 5, and exhibits in this case two minima in the frequency regions of the MF groups, and a quasi flat spectrum in the other regions.

Then, in (42) the two minima MIN1 and MIN2 and their respective positions K1 and K2 are detected on each group of MF frequencies. For improving reliability, in each MF group, the second minima are also detected,i.e.: the values DMIN1 and DMIN2 respectively in group 1 and group 2, which are the lowest amplitudes when MIN1 and MIN2 have been discarded, i.e. they are the next to lowest.

Then, in (44) several ratios are computed, in order to make relative measures of the sharpness of the resonances.

The ratio RT1=MIN1/MEAN of the minimum value MIN1 to the value MEAN gives an estimate of the sharpness of the resonance in group 1, when compared to the overall spectrum.

The ratio RT2=MIN2/MEAN of the minimum value MIN2 to the value MEAN gives an estimate of the sharpness of the resonance in group 2, when compared to the overall spectrum.

The ratio RT3=MIN1/DMIN1 of the minimum value MIN1 to the second minimum DMIN1 gives an accurate estimate of the sharpness of the resonance in group 1, when compared to the frequences of group 2.

The ratio RT4=MIN2/DMIN2 of the minimum value MIN2 to the second minimum DMIN2 gives an accurate estimate of the sharpness of the resonance in group 2, when compared to the frequencies of group 2.

The ratio RT5=MIN1/F("O") of the minimum value MIN1 to the refernce frequency F("O") (500 Hz in our case) gives an additional information on the shape of the spectrum.

These ratios are then compared in (46) to pre-determined thresholds TH1 through TH5. If all the tests are positive, the detection is confirmed for the current block, and the corresponding digit, i.e. received frequency value(s) (thus the tone) is (are) derived from the indices K1 and K2 by table look-up based on closest values to contents of MF groups 1 and group 2.

These thresholds based detections provide for a convenient means to limit the risk of false tone detections.

Validation (36):

The validation of the detected digit is based on a gating operation using the stationary computed in the first building block; and, a timing analysis.

Assuming 10 ms analysis blocks, and considering that, as specified by the CCITT, for MFR's, the tones can be as short as 40 ms, the detection is validated if the same digit is detected for at least 2 consecutive blocks.

In this case, the detection is furthermore confirmed if the energy of the detected tone lies within the CCITT expected range.

After a tone has been detected, the inter-tone silence is detected by energy measurement, and the next tone is expected only after the CCITT recommmmended inter-silence time has been counted.

The invention has actually implemented using programmed signal processor already used for implementing the VEPC coder as disclosed for instance in the above cited Journal of IBM Research and Development reference. The MFR algorithm improved to increase reliability consists of the following logical parts:

1. The DFT is computed for the nine (9) frequencies using equation (4), a real and imaginary part is computed then the modules.

2. The modules of each group ("first" and "second") are scanned to find the minimum, its index (0 to 3 and 4 to 7) as well as the second minimum. The information is stored in two buffers.

3. The minimum of each group are successively compared to a weighted mean of the nine DFT modules and to the second minimum of the group in order to verify the sharpness of the spectrum which should characterize a tone.

4. To prevent false detection in voice windows where the spectral information could be identical to the one contained in a tone window, the quadratic difference of the autocorrelation coefficients from one 10 ms window to the next in computed. The difference is compared to a threshold. These results enable eventually resetting the validation process and preparing or authorizing an additional processing which in called backup processing.

5. Given the value of the detected tone and information about the stability (or stationarity) of the A(i)'s (poles inside or outside the unit circle), about the stability of the autocorrelation (switch from silence to signal, from signal to silence of continuity) and the "history" of the previous windows, the tone is validated or not and the "history" is updated.

6. If the backup processing has been authorized, the basic same computations steps 1, 2, 3, 5 are perfomred again on a new 20 ms overlapping window containing 80 samples from the previous regular 20 ms window and the first 80 samples of the actual 20 ms window.

7. If a tone has been validated, its number is passed on a routine which in the VEPC environment will build a new transmitted frame. If no tones aqre validated, the tone number is set arbitrarily to −1.

8. The tone remains validated as long as no transition is detected by the study of the autocorrelation coefficients.

Figure 6:
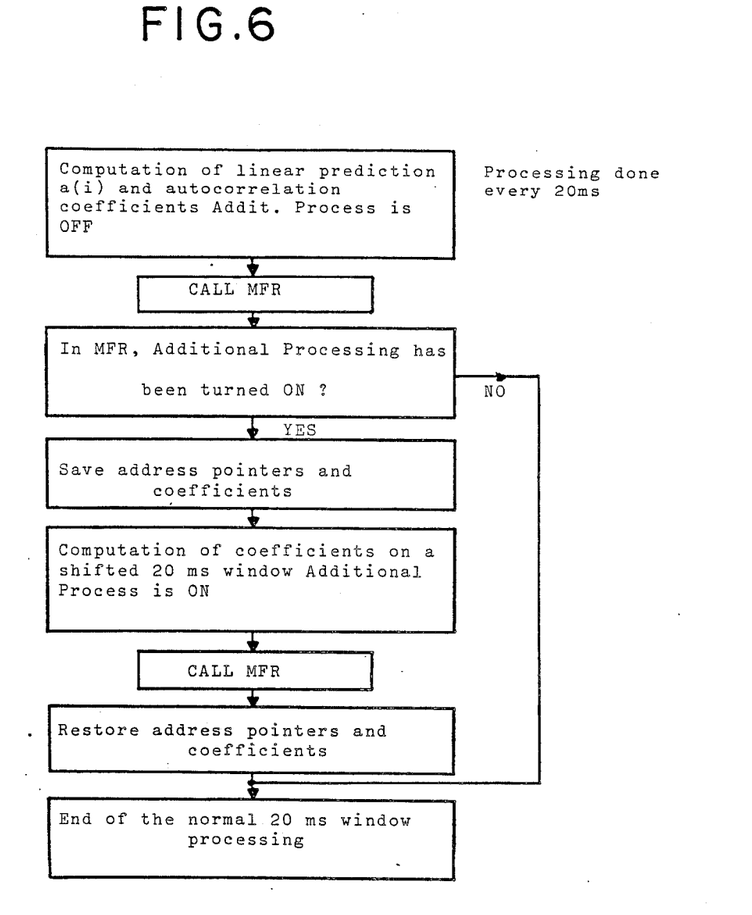
FIG. 6–8 are flow charts of this invention when implemented on a programmed processor.

One may note for instance the inclusion of additional processing, as mentioned in FIG. 6.

FIG. 6 represents the general flow chart for implementing the invention on a 20 ms basis using the programmed processor disclosed in the above cited IBM Journal reference.

The MFR routine supposes the existence of an LPC for the linear prediction coefficients and the autocorrelation computation routines where two sets of autocorrelation coefficients (RI) are computed on a 10 ms basis (80 samples). Estimates of 10 ms window autocorrelation coefficients are sufficient and can be easily derived on the fly from a regular computation on 20 ms window.

Figure 7:
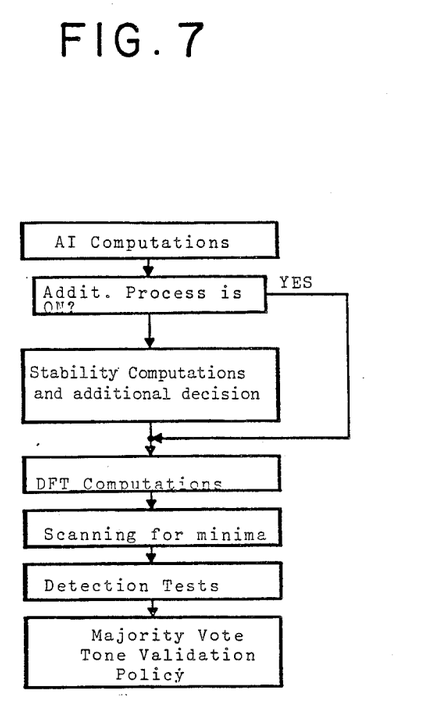

The MFR specific flow chart is represented in FIG. 7.

In MFR when Additional Process is OFF at entry time, a decision is taken as to turn it ON or to let it OFF. When it is ON at entry time, the decision process is bypassed and Additional Process will be turned OFF before the next call to MFR.

When Additional Processing has been decided, the computations are done on a shifted 20 ms window. One needs them to recompute the autocorrelation coefficients (on a 20 ms basis) in order to derive the new set of a(i) coefficients. If we do not want to disturb the process which uses the previous set of a(i)'s, they have to be temporarily stored as well as some buffer pointers.

Once the second call to MFR is performed, the old a(i)'s and buffer pointers are restored to be further used (by the VEPC application for instance).

Figure 8:
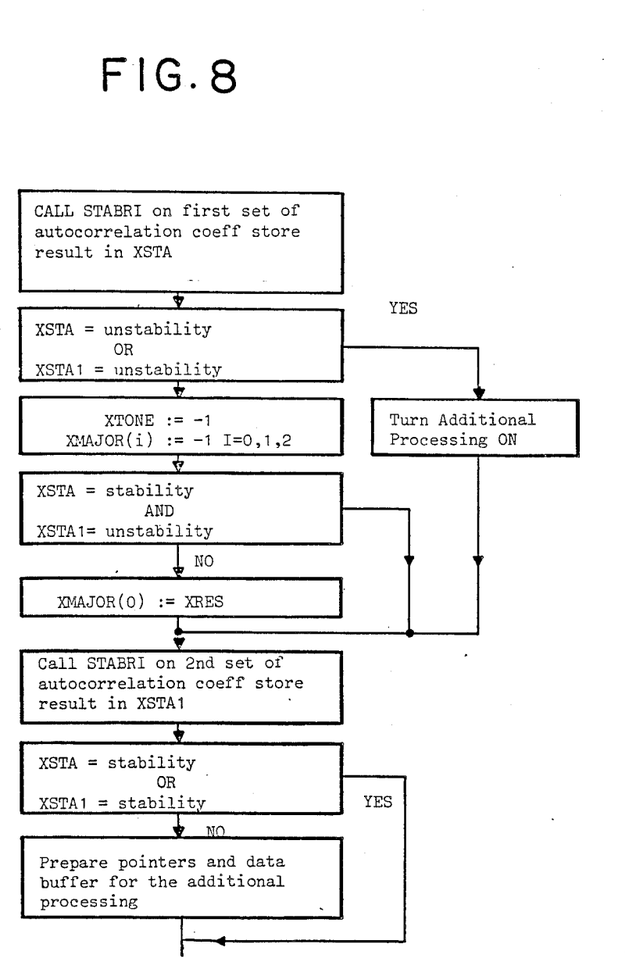

Stability computation and additional process decision is made according to the flow chart of FIG. 8.

In XSTA is stored the information about the "stability" of the first 10 ms signal within the 20 ms window. In XSTA1, the information about the last 10 ms.

Some comparisons are made between XSTA and XSTA1 of the previous 20 ms window so as to indentify the beginning or the end of a tone and take the appropriate actions.

XTONE is the output variable set to −1 when no tone is present and set to a value between 0 and 15 when a tone has been validated and as long as it is validated.

XMAJOR is the buffer in which each detected tone is stored along with its number of appearance since the last reset.

XRES is the value of the tone detected if any.

STABRI is a subroutine implementing the stability computations on the R(i)'s as mentioned with reference to FIG. 3. These operations are made to derive a logic decision and set a bit to up level upon detecting stationarity (i.e. stability) on the successive sets of R(i)'s.

The so called stability of the autocorrelation consists of computing the quadratic difference between two sets of successive autocorrelation coefficients. If this difference is less than a given threshold, the autocorrelation is said to be stable, otherwise it is said to be unstable.

In any given 20 ms window, we now compute twice the stability of the autocorrelation which results in two flags, one for each 10 ms sub-window. The computation of the flags takes place in two pass so comparisons can be made between the first flag and the second of the previous window. Depending on the values taken by the flags of each sub-window, different types of action are taken:

1. The "previous" second flag or the first flag indicate an instability. We may be at the beginning or the end of a tone so a validation latch which contains the tone number and the last positions of the array which is used to record detected tones prior to validation are reset to −1. If the "previous" flag indicates instability and the first flag indicates stability, the tone may have begun during the previous window. So XRES, value of the detected tone (if any) is stored back in the first position of the array. Otherwise that position is reset to −1.

2. The first or the second flag indicate stability. We may be in a tone so we can already prepare the data buffer for the backup processing, that is: store the last 80 samples of the input buffer prior to any normalization.

3. The first flag indicates a stability and the "previous" second flag also. We are in a tone and backup processing can be allowed. The data buffer is completed with the first 80 samples of input data prior to any normalization (before the preemphasis).

We use data prior to any normalization so the preemphasis (see IBM Journal reference) and the needed normalization remain coherent.

Next operation to be performed according to the flow chart of FIG. 7 relates now to DFT computation. The modules of the DFT values are derived from equation (4) for each one of the CCITT defined frequencies, plus the 500 hz reference frequency.

$$DFT(f(k)) = \sum_{n=0}^{p-1} a(n) \cdot e^{-2j\cdot\pi\cdot n \cdot f(k)/fs} \quad k = 0, \ldots, 8$$

$$= \sum_{n=0}^{p-1} a(n) \cdot (\cos(2\pi \cdot n \cdot f(k)/fs) - j\sin(2\pi \cdot n \cdot f(k)/fs))$$

$$= \sum_{n=0}^{p-1} a(n) \cdot (\cos(2\pi \cdot n \cdot f(k)/fs) - j\sum_{n=0}^{p-1} a(n) \cdot \sin(2\pi \cdot n \cdot f(k)/fs)$$

$$= FR(k) - jFI(k)$$

SAMPLING FREQUENCY!fs = 8000
N.B. $\pi = 3.14$

The Sine and Cosine needed are computed using a recurrent formula where the initial values ($\cos(2\pi \cdot f(k)/fs)$ and $\sin(2\pi \cdot f(k)/fs)$ for $K = 0, \ldots, 8$) are declared as constants in the program:

$$\cos(2\pi \cdot n + 1 \cdot f(k)/fs) = \cos(2\pi \cdot f(k)/fs) * \cos(2\pi \cdot n \cdot f(k)/fs) - \sin(2\pi \cdot f(k)/fs) * \sin(2\pi \cdot n \cdot f(k)/fs)$$

$$\sin(2\pi \cdot n + 1 \cdot f(k)/fs) = \sin(2\pi \cdot f(k)/fs) * \cos(2\pi \cdot n \cdot f(k)/fs) - \cos(2\pi \cdot f(k)/fs) * \sin(2\pi \cdot n \cdot f(k)/fs)$$

Modules are then computed the usual way:

$$FF(k) = |FFT(f(k))|^2 = FR(k)^2 + FI(k)^2 \quad k = 0, \ldots 8$$

Once we have the DFT values for the nine frequencies, we have to find the positions of the minima and of the second minima in each frequency group, through a scanning of the values derived from DFT computations.

Next, the detection and validation policies consist of a set of computations, tests and logical operations. Calculations and tests are the same for each policy, the logical operations define then the policy as successive detection or majority vote.

The Discrete Fourier Transform subroutines provide a set of nine (9) values: One for each of the CCITT frequency plus the one for a reference frequency of 500 Hz.

The previous step enables determining in each of the frequency group which one has the smallest DFT value and which one has the "second smallest".

Calling the DFT values of these frequencies XIND1, XDIND1, XIND2, XDIND2 and computing MEAN as the summation of the nine DFT values, we test the following assumptions, which are used to verify the sharpness of the spectrum around the minima:

$$MEAN = \sum_{k=0}^{8} FF(k)$$

1. XIND1 < MEAN/110
2. XIND1/XDIND1 < 0.73
3. 21.XIND1 < FF(500)
4. XIND2 < MEAN/110
5. XIND2/XDIND2 < 0.73

If any of these relations is not verified the tone is declared undetected over the current 20 ms window, and the variable storing the result (XRES) is given an arbitrary value.

If all of them are verified the tone is declared detected and the computation is completed to translate the two indexes of the minima in a tone number between 0 and 15. The result is stored in XRES and is passed to the validation logic.

For successive detection of the same tone, a counter is used which is set to 0 or incremented. When it reaches one (1) the tone is declared validated and the corresponding flag is set. The result is not modified by the remaining 20 ms windows. The flag as well as the tone number is passed to the Main program.

The counter is incremented each time a tone number equal to the previous one (20 ms windows) has been detected and that neither the autocorrelation nor the LPC's instability flags are set.

If the LPC's instability flag is set and the previous 20 ms window has detected a valid tone number, this number is validated and the tone is declared as detected.

If the autocorrelation instability flag is set and a valid tone number has been detected the counter remains unchanged.

Reliability of the process may be improved through a majority vote over m 20 ms windows.

This operation uses the fact that very often, one window only out of three or more leads to a non or false detection. Also in almost every case the beginning of the tone is well detected by the "stabililty" of the autocorrelation.

It sounds therefore reasonable to set a vector which will record the different tone detected and which elements would be a combination of a tone number and of an occurrence counter.

By comparing the value of the ocunter with a present value, one could decide if a tone should be validated.

Majority (I) = (Tone Number)·16 + Number of occurrences I = 1, N

If the instability of the AI's (too much AI's set to zero) may have impaired the computation precision, the program return to MFR, otherwise the algorithm updates the Majority vector, adding one to an already existing Tone number or creating a new entry.

If a tone has been already validated nothing else happens. Otherwise the program looks for any tone which occurred at least n times. n being predefined and being equal to two (2) in the current implementation.

When the predefined occurrences number has been reached, two flags are set to indicate that a tone is validated and that until the next autocorrelation "instability", no other tone should be.

The majority vector is reset depending on the value of the autocorrelation stability flags computed during the previous and actual windows as explained before.

We claim:

1. A digital process for detecting, within a received signal, the presence of a tone comprising at least one single frequency f(k) said received signal being sampled at a frequency fs and digitally encoded using Linear Prediction Coding techniques over fixed lengths blocks of samples said encoding providing a set of coefficients a(i) per block,, i=0, . . . ,p, with p being a predetermined integer value, said processing including:

computing Fourier transform terms A(f(k)) over said a(i) set $$A(f(k)) = \mathop{SUM}_{n=0}^{P-1} a(n) \cdot e^{-2j\pi \cdot n \cdot f(k)/fs}$$

for f(k) being equal to each of said tone frequency(ies);

deriving a tone amplitude F(k) from each A(f(k), using:

$$F(k) = |A(f(k))|$$

comparing said tone amplitude to a predetermined threshold(s) to detect said tone reception.

2. A digital process for detecting, within a received signal, the presence of a tone comprising at least one single frequency f(k) said received signal being sampled at a frequency fs and digitally encoded using Linear Prediction Coding techniques said digital encoding including strobing and splitting the received flow of samples using a fixed length time window to derive a block of samples within each time window, processing the current block of samples to derive therefrom a set of a(i) coefficients i=0, . . . ,p with p being a predetermined integer value, said detecting process including:

(a) computing Fourier transform terms A(f(k)) over said a(i) set $$A(f(k)) = \mathop{SUM}_{n=0}^{P-1} a(n) \cdot e^{-2j\pi \cdot n \cdot f(k)/fs}$$

for f(k) being equal to each of said tone frequency(ies);

(b) deriving a tone amplitude F(k) from each A(f(k), using:

$$F(k) = |A(f(k))|$$

(c) comparing said tone amplitude to a predetermined threshold(s) to detect said tone reception;

(d) shifting said time window over a predetermined portion of its width, deriving the a(i)'s for the block of samples over the shifted window, and, (e) starting over said steps "a" through "c", whereby the tone detection is being confirmed upon said threshold comparison being successful.

3. A digital tone detection process according to claim 1, or 2 wherein said received signal includes a reference signal f(0), said process being characterized in that said Fourier Transform term computation and amplitude derivation are also performed over f(k)=f(0).

4. A digital process for detecting, within a received signal, the presence of a tone combining at least two single frequencies, each within a different group of predetermined frequencies f(k) said received signal being sampled at a frequency fs and digitally encoded using Linear Prediction Coding techniques over fixed lengths blocks of signal samples, said encoding providing a set of direct form or linear prediction coefficients a(i) and a set of autocorrelation coefficients R(i) per block, i=0, . . . , p, with p being a predetermined integer value, said process including:

computing for each set of direct form coefficients, a set of Fourier Transform terms A(f(k)), $$A(f(k)) = \mathop{SUM}_{n=0}^{P-1} a(n) \cdot e^{-2j\pi \cdot f \cdot n \cdot (k)/fs}$$

wherein k=0, . . . ,N; N being the overall number of said predetermined frequencies;

deriving a frequency amplitude F(k) from each A(f(k)), using:

$$F(k) = |A(f(k))|$$

computing a MEAN value over the F(k) for each set of F(k)'s;

detecting at least one Minimal F(k) value (MIN) within each of said groups and deriving the corresponding frequency (K);

computing ratios RT=MIN/MEAN;

comparing said RT ratios to predetermined thresholds to confirm detection; and, identifying the received tone based on the detached K values upon said detection being confirmed.

5. A digital tone detection process according to claim 4 wherein said tone detection further includes:

computing for each block of signal samples, a stationarity parameter S, with $$S = \mathop{SUM}_{i=0}^{P} |R(i) - R(old)(i)|$$

where R(old) (i), i=0, . . . ,p represents the set of auto correlation coefficients obtained at the previous block of samples, while R(i) reference is used for the current block;

comparing S to a predetermined threshold THO and setting true a logic condition for S<THO; and, using said condition to validate said received tone identification.

6. A digital tone detection process according to claim 5 further characterized in that said received tone identification is performed through a Table look-up operation.

7. A digital tone detection process according to claim 6 wherein said tone identification is further confirmed upon said validation being positive for a predetermined number of consecutive blocks of samples.

8. A digital tone detection process according to claim 7 wherein said confirmation further includes measuring the energy of the received tone and checking that said measured energy level falls within expected range.

9. A digital tone detection process according to claim 8. Further confirmed upon said validation being positive for a predetermined number of non consecutive blocks of samples.

10. A device for detecting, within a received signal the presence of a tone combining two single frequencies, each within a different first or second group of predetermined frequencies f(k), said received signal being sampled at a frequency fs and digitally encoded using Linear Prediction Coding techniques over fixed lenths blocks of samples, said encoding providing a set of autocorrelation coefficients R(i) and a set of direct form coefficients a(i) per block, i=0, . . . ,p, with p being a predetermined integer value, said device including:

block stationarity detection means fed with said autocorrelation coefficients and setting a stationarity logic level to "1" upon detecting that said autocorrelation coefficients variations from one block to the next remain within a predetermined level;

Fourier transform computing means fed with a(i) coefficients and providing $$A(f(k)) = \sum_{n=0}^{p-1} a(n) \cdot e^{-2j\pi \cdot f \cdot n \cdot (k)/fs}$$

for k being an integer value varying up to the total number of said predetermined frequencies;

amplitude measuring means connected to said Fourier transform means for providing F(k) values, $$F(k) = |A(f(k))|;$$

detection means connected to said amplitude measuring means for detecting the reception of a tone; and, validation means connected to said block stationarity detection means and to said detection means, to validate said detected tone.

11. A device according to claim 10 wherein said received signal further includes a reference frequency f(0).

12. A device according to claim 11 wherein said detection means include:

mean value computing means connected to said amplitude measuring means for computing a MEAN amplitude value over each block of F(k)'s, minima detecting means connected to said amplitude measuring means for detecting a first (MIN1 and MIN2) and a second (DMIN1 and DMIN2) minimal F(k) value within each of said first and second groups of predetermined frequencies;

position detection means sensitive to said minima for detecting the k values (K1 and K2) corresponding to said minima values;

ratio computing means sensitive to said MEAN value and to said Minima values to compute ratios values;

testing means for comparing said ratios to predetermined thresholds, and provide a detection confirmation data;

table look up means gated by said confirmation data and addressed by said K1 and K2 value to identify the received tone.

13. A multifrequency receiver for detecting a tone and including a detection according to any one of claim 10-11.

* * * * *

UNITED STATES PATENT AND TRADEMARK OFFICE
CERTIFICATE OF CORRECTION

PATENT NO. : 4,782,523

DATED : November 1, 1988

INVENTOR(S) : Claude Galand et al

It is certified that error appears in the above-identified patent and that said Letters Patent is hereby corrected as shown below:

Claim 10, Col. 13, line 3, change "lenths" to -- lengths --.

Claim 13, Col. 14, line 29, after "detection" insert -- device --.

Signed and Sealed this

Seventh Day of March, 1989

Attest:

DONALD J. QUIGG

*Attesting Officer*  Commissioner of Patents and Trademarks